May 28, 1968     R. L. CARMON     3,385,517

CENTRIFUGAL PURIFIER

Filed Oct. 23, 1965     2 Sheets-Sheet 1

INVENTOR.
Richard L. Carmon
BY
Carness, Dickey & Pierce
ATTORNEYS

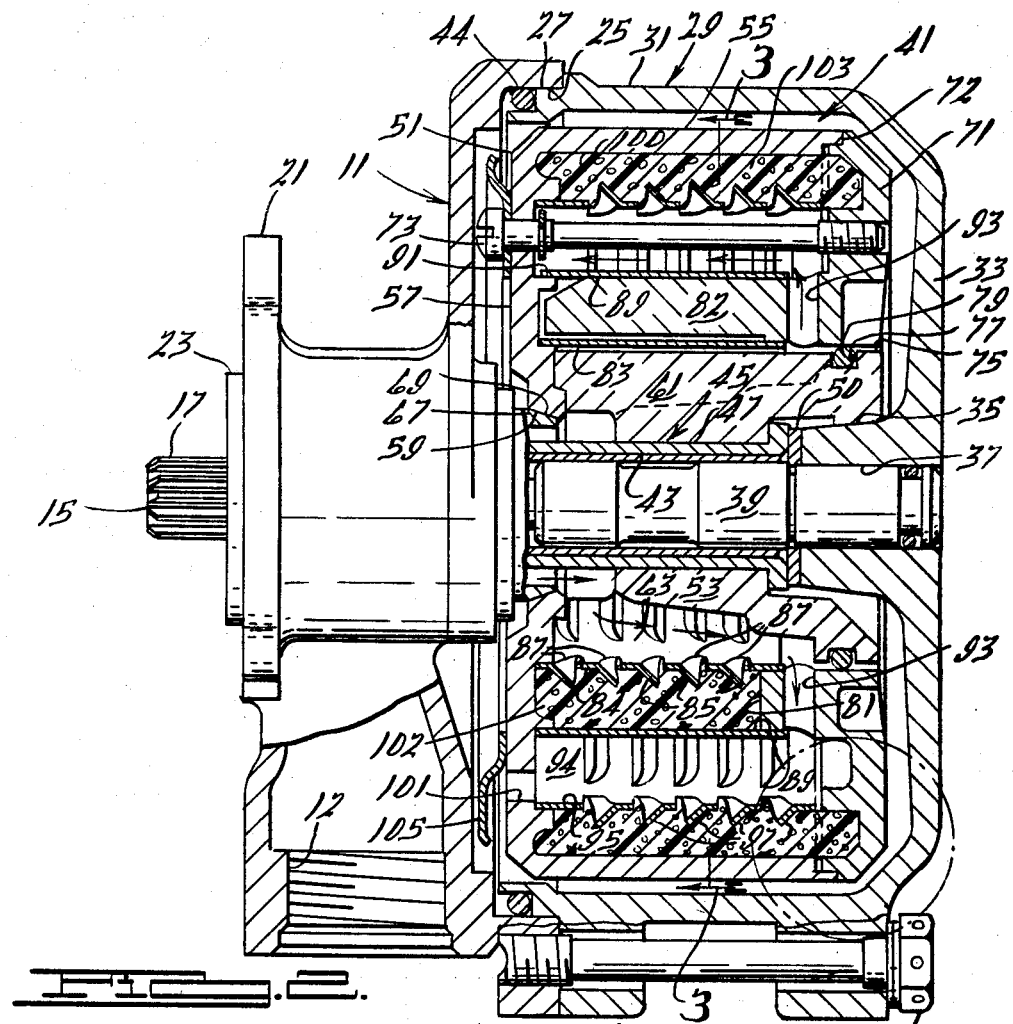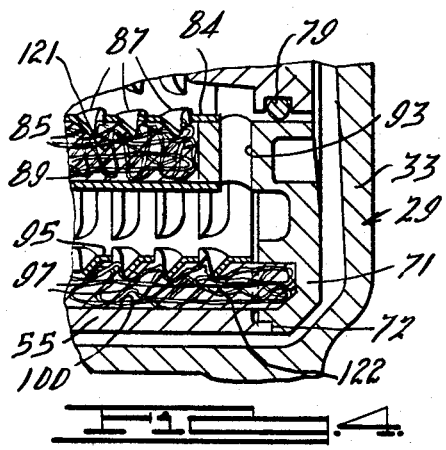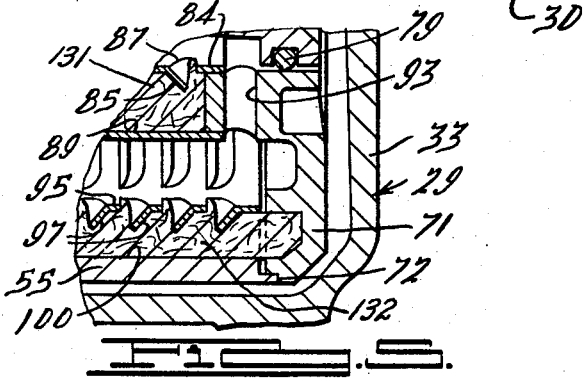

United States Patent Office 3,385,517
Patented May 28, 1968

3,385,517
CENTRIFUGAL PURIFIER
Richard L. Carmon, Birmingham, Mich., assignor to Michigan Dynamics, Inc., a corporation of Michigan
Filed Oct. 23, 1965, Ser. No. 503,924
4 Claims. (Cl. 233—2)

ABSTRACT OF THE DISCLOSURE

A centrifugal purifier for centrifugally removing foreign particles from a fluid. The purified includes an impeller for generating a centrifugal force to a fluid within a cavity and a contaminant repository positioned at the periphery of this cavity. The contaminant repository is defined in part by a perforate wall so that the removed particles may enter the repository. In addition, a foraminous entrapment media fills the cavity for precluding re-entry of the particles into the cavity upon cessation of rotation of the impeller.

This invention relates to a centrifugal purifier for removing entrained contaminants from a fluid, and more particularly to an entrapment device for precluding the re-entry of the contaminants to the filtered system.

Rex C. Darnell Patent 3,050,240, issued Aug. 21, 1962, entitled "Centrifugal Contaminant Extractor," and assigned to the assignee of this invention, illustrates a centrifugal purifier wherein contaminants are separated from a fluid by means of centrifugal force. The fluid and entrained contaminants are centrifuged by a rotating impeller and the contaminants pass into a contaminant repository that is positioned around the impeller cavity. An inner shell that defines the inner surface of the contaminant repository has specially formed louvers for permitting the contaminants to enter the repository and which aid in precluding the re-entry of the contaminants to the fluid system. In certain applications, however, it is desirable to provide a more positive means of assuring that the contaminants will not re-enter the fluid system.

It is, therefore, an object of this invention to provide a centrifugal purifier for removing contaminants from a fluid that includes means for assuring that the separated contaminants will not re-enter the fluid.

It is a still further object of the invention to provide a centrifugal purifier for driving contaminants into a rotating annular contaminant repository wherein means are provided in the repository for precluding the re-entry of the contaminants to the fluid system.

A centrifugal purifier embodying this invention includes a housing defining a fluid cavity. A rotatable impeller is disposed within the cavity for imparting a centrifugal force to fluid and entrained contaminants within the cavity. A contaminant repository is positioned in fluid communication with the fluid cavity for receiving the contaminants driven from the main flow stream of the fluid by the centrifugal force. A foraminous entrapment media at least partially fills the contaminant repository for entrapping the contaminants within the contaminant repository and for resisting their return to the fluid cavity during times when the centrifugal force decreases due to a decrease in the speed of rotation or upon reverse flow.

Other objects and advantages of this invention will become more apparent as this description proceeds, particularly when considered in conjunction with the accompanying drawings, wherein:

FIGURE 3 is a cross-sectional view taken along the line 3—3 of FIGURE 2;

FIGURE 4 is an enlarged partial cross-sectional view of the encircled area in FIGURE 2, showing another embodiment of the invention; and FIGURE 5 is a cross-sectional view, in part similar to FIGURE 4, showing a further embodiment of the invention.

Figure 1:
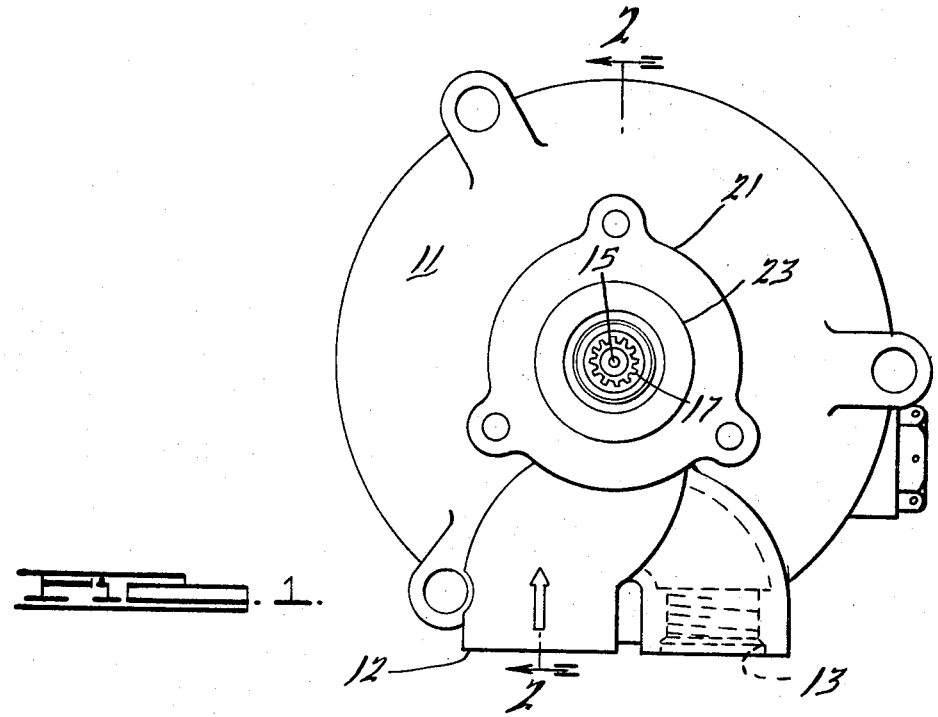
FIGURE 1 is an elevational view of a centrifugal purifier embodying this invention.
Figure 2:
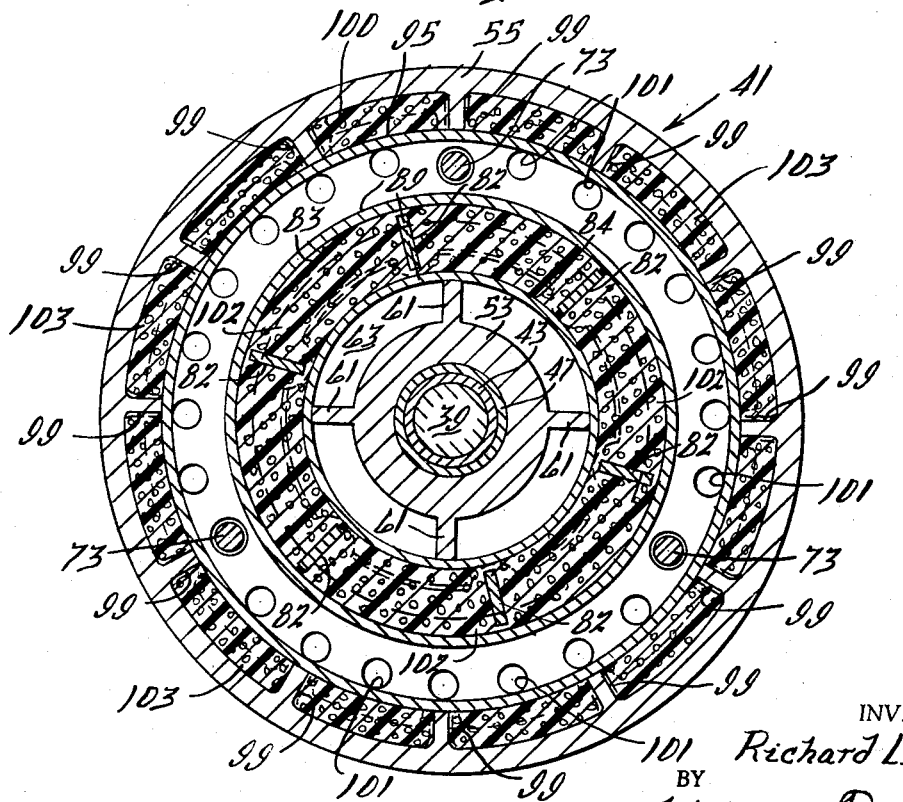
FIGURE 2 is a cross-sectional view taken generally along the line 2—2 of FIGURE 1.

Referring now in detail to the embodiment shown in FIGURES 1 through 3 of the drawings, the illustrated centrifugal purifier has many features in common with that shown in the aforementioned Darnell patent and reference may be had to that patent for specific operational features of the purifier. Generally, however, the purifier comprises a housing cover 11 that defines a fluid inlet passage 12 and a fluid outlet passage 13. Fluid is introduced to the purifier through the inlet passage 12 and discharged from it through the outlet passage 13. The purifier may be utilized in any fluid system, but has particular application in the fuel systems of aircraft engines.

The cover 11 defines a cylindrical bearing portion in which a drive shaft 15 having a splined outer end 17 is journaled. The splined end 17 is adapted to be connected to a suitable driving prime mover, for example an aircraft engine. The left-hand side of the cover 11, as viewed in FIGURE 2, is provided with an apertured flange 21 by which the entire device may be supportingly bolted to an engine framework or other supporting body (not shown). A pilot shoulder 23 is located radially inwardly from the flange 21 in order to accurately align the splined end 17 of the shaft 15 with its driving member.

The right-hand side of the cover 11 is provided with an annular flange 25 coaxial with the axis of the shaft 15 and within which the annular extremity 27 of a generally cup shaped, stationary housing 29 registers. Three identical bolts 30 serve to hold the housing 29 to the cover 11. The housing 29 is provided with an annular outer wall 31 and a generally circular end wall 33 having a hub 35 formed on the inside surface thereof. The hub 35 is provided with a bore 37 within which one end of a supporting spindle 39 is fixedly mounted. The cover 11 and its cooperating housing 29 form an enclosure within which a centrifuge assembly, indicated generally at 41, is rotatably supported on the spindle 39 through a sleeve bearing 43. An O-ring seal 44 is contained within the space between the flange 25 and housing extremity 27 to insure against leakage.

The centrifuge assembly 41 is provided at its center with a drive member 45, having a sleeve portion 47 journaled on the bearing 43 and abutting a thrust washer 50. One end of the drive member 45 is splined to engage a splined inner end of the drive shaft 15 (not shown) thereby rotatably connecting the centrifuge assembly 41 to the drive shaft 15.

A main body 51 of the centrifuge includes a central hub portion 53 that is fixed for rotation with the drive member 45 in any suitable manner, an annular outer wall 55 and a generally circular side wall 57 having a central tapered opening 59 through which the drive member 45 extends. Additionally, the hub portion 53 is provided with four circumferentially spaced, axially extending, radial ribs 61 that integrally connect the hub 53 to the side wall 57.

Fuel or other liquid to be cleaned is admitted to the centrifuge assembly 41 from the inlet passage 12 through suitable passages formed in the cover 11. From the cover 11 the liquid is discharged into a fluid cavity 63 that contained the impellers 61 by an annular channel defined between the drive member 45 and a seal member 67. The seal member 67 is provided with a tapered end 69 adapted to matingly register within the tapered hole 59 of the centrifuge body side wall 57. Fluid flowing through this annular channel is thus directed into the fluid cavity 63 between the ribs 61 which, upon rotation of the centrifuge assembly 41, operate as impellers, causing the incoming liquid to rotate with the centrifuge.

The end of the centrifuge assembly 41 opposite from the side wall 57 is closed by a centrifuge cover member 71 that is generally annular in shape and engages the end wall 55 of the centrifuge body at its outer periphery 72. Three identical screws 73 secure the cover member 71 in position. The inner diameter of the cover member 71 is disposed in closely spaced relationship to the outer periphery 75 of the centrifuge hub 53 which has a groove 77 formed therein positioning an O-ring 79 in sealing engagement between the hub 53 and the cover member 71.

An annular shoulder 81 extends inwardly from the centrifuge cover 71 around the hub 53 and is provided with six circumferentially spaced radial vanes 82 extending inwardly therefrom to the side wall 57 of the centrifuge body 51 within a first annular contaminant repository 83. The vanes 82 serve a contaminant distribution function which will be hereinafter described.

Disposed within the centrifuge body and sleeved into a central aperture of the annular shoulder 81 is a first annular sleeve 84 having rows of spaced louvers 85 disposed between each of the contaminant distribution vanes 82. The sleeve 84 defines the inner periphery of the first contaminant repository 83 and the outer periphery of the first fluid chamber 63. The louvers 85 are formed by cutting and bending up sections of the sleeve 84 to form slots or openings 87 that are partially covered by the louvers 85. The louvers extend out of the plane of sleeve 84 at a 45° angle to the axis of rotation of the centrifuge assembly 41 and extend generally in the direction of travel of the liquid. The openings 87 serve to admit contaminant particles to the contaminant repository 83 formed between the sleeve 84 and an annular shell 89 which is in pressed fit relationship with the centrifuge body 51 around a shoulder 91 formed on the side wall 57 and which slidably registers on the radially outward sides of the vanes 82.

At the outer end of the annular channel or space formed between the perforate sleeve 84 and the centrifuge hub 53 are a plurality of radially arranged ports 93 formed in the end cover shoulder 81 which serve to conduct liquid radially outwardly to a second annular fluid chamber 94 bounded at its inner diameter by the shell 89 and at its outer diameter by a second louvered sleeve 95. The sleeve 95 also is provided with rows of louvers 97 which extend at a 45° angle to the axis of rotation and which extend generally in the direction of the liquid flow. Located radially outwardly from the louvered sleeve 95 is the annular outer wall 55 of the centrifuge body 51 which has a plurality of identical circumferentially spaced and radially inwardly extending vanes 99 disposed between adjacent rows of louvers 97 within a second contaminant repository 100. The vanes 99 serve an identical contaminant separating function as the vanes 82, which function will be hereinafter described. The side wall 57 of the centrifuge body 51 is provided with a series of circumferentially spaced exit holes 101 communicating with the second annular fluid chamber 94 formed between the shell 89 and the outer louvered sleeve 95 in order to permit the flow of liquid out of the centrifuge body to the outlet passage 13 in the cover 11 through suitable fluid passages formed therein.

The centrifugal purifier thus far described is similar in construction to that described in the aforementioned Darnell patent and reference may be had thereto for details regarding the specific sealing or driving structure. The operation is also similar in that contaminated liquid is admitted through the inlet passage 12, generally under pressure. In aircraft usage the fuel is drawn into the inlet passage 12 by a fuel pump (not shown) located upstream from the purifier. From the inlet passage 12 the fuel flows along the annular channel between the seal members 67 and the drive member 45 to the first fluid cavity 63 of the centrifuge assembly 41. The entire centrifuge assembly 41 is driven through the drive shaft 15 at a high rotational speed of, for example 6500 r.p.m. which is sufficient to produce a G value of 938 at the diameter of the first louvered sleeve 84. The rotation of the centrifuge assembly 41 and particularly the vanes 61 causes the incoming liquid to rotate with the centrifuge and imparts to it this high gravitational force.

Contaminant contained in the incoming liquid is thrown radially outwardly against the louvered sleeve 84 and the contaminant particles pass through the slots or openings 87 into the first contaminant repository 83.

Although the centrifugal force exerted upon the contaminants during the rotation of the centrifuge assembly 41 is sufficient to contain them within the first contaminant repository 83, the heavier particles might escape from the repository 83 due to operational force when rotation is ceased or the speed diminished or if reverse flow occurs. The escaping particles could re-enter the engine fuel system. To preclude this escape a foraminous contaminant retention media, indicated generally by the reference numeral 102, at least partially fills the first contaminant repository 83. The retention media 102 may be a reticulated foamed plastic such as polyurethane or, as will be noted below, other media may be employed to serve the retention function. The media 102 also tends to equalize the distribution of the contaminants throughout the repository 83 and to preclude their movement within or from or to the lower section of the repository when the centrifuge assembly 41 is in a state of rest. The ribs 82 also insure that the contaminants will not work their way to the lower section and thus cause a concentrated mass in one location which would give rise to a prohibitive state of unbalance when the centrifuge 41 was again rotated.

The louvered sleeve 84 also assists in preventing separated contaminant from falling back into the fluid passageway for remixing with the cleaned fluid. The louvers 85 are designed to substantially overlap the openings 87 in a manner preventing re-entry of the contaminant into the fluid passageway yet permitting the proper entrance of the contaminant into the repository. The louver construction is such that an angled surface is presented to the incoming contaminant assuring the continued movement of the contaminant into the storage cavity.

In view of the fact that the hub 53 and the louvered sleeve 84 produce an annular chamber of relatively large size compared to the inlet annulus formed between the seal member 67 and the drive member 45, the axial flow of liquid across the louvered sleeve 84 is sufficiently slow to afford time for a high degree of contaminant separation. Test data indicates that particle sizes down to 10 microns are extracted from contaminated fuel during this first centrifuging stage.

When the liquid reaches the end of the first louvered sleeve 84 it passes radially through the ports 93 into the second annular fluid cavity 94 bounded by the second louvered sleeve 95 and the shell 89, following the course indicated by the arrows in FIGURE 2. The fluid then flows axially along this annular passageway in the opposite direction from the flow of fluid in the first passage.

The second louvered sleeve 95 functions in identical manner to the first louvered sleeve 84 with contaminant being admitted to the second contaminant repository 100 formed between the louvered sleeve 95 and the annular outer wall 55 of the centrifuge body 51.

The second contaminant repository 100 is also filled with a foraminous contaminant retention media 103, which may be a reticulated foamed plastic such as polyurethane. The media 103 insures that the contaminant will not re-enter the fluid when the centrifuge 41 is at rest. It also aids in insuring that there will be an even distribution of contaminant within the repository 100 to guard against imbalance. As in the first contaminant repository 83, the ribs 99 assist in the separating and locating function. The shape of the louvers 97 also assist in insuring against re-entry of the contaminants to the fluid.

In travelling axially along the second louvered sleeve 95 the liquid is subjected to centrifugal forces of approximately 1800 G's because of the greater radial distance from the axis of rotation. This high centrifugal force is sufficient to purge fine constituents of contaminants in the region of two to ten microns from the liquid.

The fluid having been purged of all but a few percentage points of contaminant particles passes through the plurality of circumferentially spaced exit holes 101 in the side wall 57 of the centrifuge body 51 which communicate with the outlet passage 13. The exit holes 101 are disposed radially outwardly of the annular inlet passage formed between the drive member 45 and seal 67. This different in radii produces a substantial G value increase. The increased G value in the radius of the exit holes 101 compared with that in the inlet chamber mentioned above is such that a strong pumping action develops, producing a pressure increase between the inlet passage 12 and the outlet passage 13 of the device. In aircraft usage this pressure increase assures an adequate supply of fuel to a high pressure fuel pump located downstream from the device and eliminates the problem of fuel pump cavitation.

When a centrifuge device of the present invention is made for installation in a particular aircraft fuel system in which a known amount of pressure increase is desired, a pressure regulating plate 105 may be secured over the exit holes 101 by the screws 73 in order to alter the effective radial distance of the outlet holes from the axis of rotation and thus alter the G value of the outgoing fuel. The pressure regulating plate 105 is generally annular in shape. The pressure regulating plate 105 illustrated in FIGURE 2 of the drawings draws the outgoing fuel radially outwardly from the exit holes 101 in order to increase the pressure boost which would be obtained in its absence. However, it will be appreciated that the pressure regulating plate 105 could be provided to effectively reduce the pressure increase by directing the fluid radially inwardly before releasing it from the centrifuge assembly 41.

As has been noted earlier, the foraminous contaminant retention media employed could be a material other than reticulated polyurethane foam. Any foraminous media that provides a large surface area surrounded by small voids may be employed as the entrapment media. FIGURE 4 illustrates an embodiment wherein packings of steel wool 121 and 122 fill the contaminant repositories 83 and 100. In all other respects this embodiment is identical to that shown in FIGURES 1 through 3 and other description of it is deemed unnecessary. Other possible medias include porous or foamed metal, metallized or metal plated polyurethane, laminated wire cloth, laminated perforated metal, metal felt, fiberglass or cellulose matting or other similar porous material.

FIGURE 5 illustrates an embodiment wherein a fibrous media packing 131 and 132 is contained within the contaminant repositories 83 and 100. The fibrous media 131 and 132 may be comprised of any synthetic or natural fibers or blend of synthetic and natural fibers. The fibers may be of the same or different diameters and lengths. Various other media of the aforementioned types may be employed as entrapment media. In some instances, the foraminous entrapment media need only be contained within one of the contaminant repositories in the embodiments disclosed in this application.

As has been noted, the described purifier also provides some boost in the pressure of the fluid being filtered. If additional boost is desired, this invention may be used in conjunction with the Contaminant Extracting Boost Pump illustrated and described in the patent of that title, Patent No. 3,178,105, issued Apr. 13, 1965, in the name of Rex C. Darnell, and assigned to the assignee of this invention.

When the dirt repository chambers have become filled the device should be disassembled and cleaned for further use. This is accomplished by removing the screws 30 and pulling the housing cover 29 off of the housing 11. The centrifuge assembly 41 is then pjulled off of the splined end 19 of the drive shaft 15 and further removed from the spindle 39. In order to facilitate removal of the centrifuge body 51 from the centrifuge cover 71, the three screws 72 are each provided with a lock ring 74 secured thereto adjacent the inside surface of the centrifuge body side wall 57. The purpose of the lock rings 74 is to act as a shoulder on the screws 72 contacting the side wall 57 of the centrifuge body 51 when the screw is loosened. Turning of the screws 72 in loosening tends to push the centrifuge cover 71 away from the body 51, breaking the close fitting sealing relationship adjacent the periphery 73 of the centrifuge side wall 55 and further breaking contact of the louvered sleeves 84 and 95 and the shell 89 with their mating surfaces. This feature eliminates the use of screw drivers and other such prying devices in parting all the surfaces which when compacted with dirt can become quite tight. Elimination of prying devices guards against the marring of fine finishes in close fitting relationships.

The centrifuge cover having been removed by the alternative loosening of the three screws 72, the dirt repositories and porous inserts are bared and may easily be cleaned by immersion in cleaning fluid of light viscosity. The foraminous porous material may be cleaned and replaced or discarded and new inserts installed, depending on design and economics. The entire device may then be reassembled by the reverse of the above described procedure.

While it will be apparent that the preferred embodiments herein demonstrated are well calculated to fulfill the objects above stated, it will be appreciated that the invention is susceptible to modification, variation and change without departing from the proper scope and fair meaning of the subjoined claims.

What is claimed is:

1. A device for purging fluids of contaminants comprising housing means defining a fluid cavity, a fluid inlet in communication with said fluid cavity and a fluid outlet in communication with said fluid cavity, a rotatable impeller disposed within said fluid cavity for imparting a centrifugal force to the fluid and contaminants entrained therein as the fluid passes from said fluid inlet to said fluid outlet, a contaminant repository disposed at the periphery of said fluid cavity, said contaminant repository being defined at least in part by a perforate wall disposed adjacent said fluid cavity, the openings in said wall being disposed to pass contaminants driven from said fluid cavity by centrifugal force into said contaminant repository, the flow path of the fluid through said device being independent of the openings in said wall for flow of the fluid from said fluid inlet to said fluid outlet independently of said openings, and a foraminous entrapment media at least partially filling said contaminant repository to assist in entrapping contaminants within said contaminant repository and to assist in resisting their return to said fluid cavity through said openings in said wall.

2. A device as set forth in claim 1 wherein the perforate wall comprises a cylindrical perforate member defining the inner periphery of the contaminant repository.

3. A device as set forth in claim 2 further including means for affixing the cylindrical perforate member to the impeller for rotation with the impeller.

4. A device as set forth in claim 1 wherein the fluid inlet and fluid outlet open into the cavity radially inwardly of the perforate wall.

References Cited

UNITED STATES PATENTS

| | | | |
|---|---|---|---|
| 868,288 | 10/1907 | Nilsson et al. | 232—2 |
| 972,030 | 10/1910 | Smith | 233—2 |
| 2,605,046 | 7/1952 | Le Clair | 233—18 |
| 2,695,133 | 11/1954 | Drury | 233—2 |
| 3,050,240 | 8/1962 | Darnell | 233—21 |

HENRY T. KLINKSIEK, *Primary Examiner.*